Patented Sept. 12, 1922.

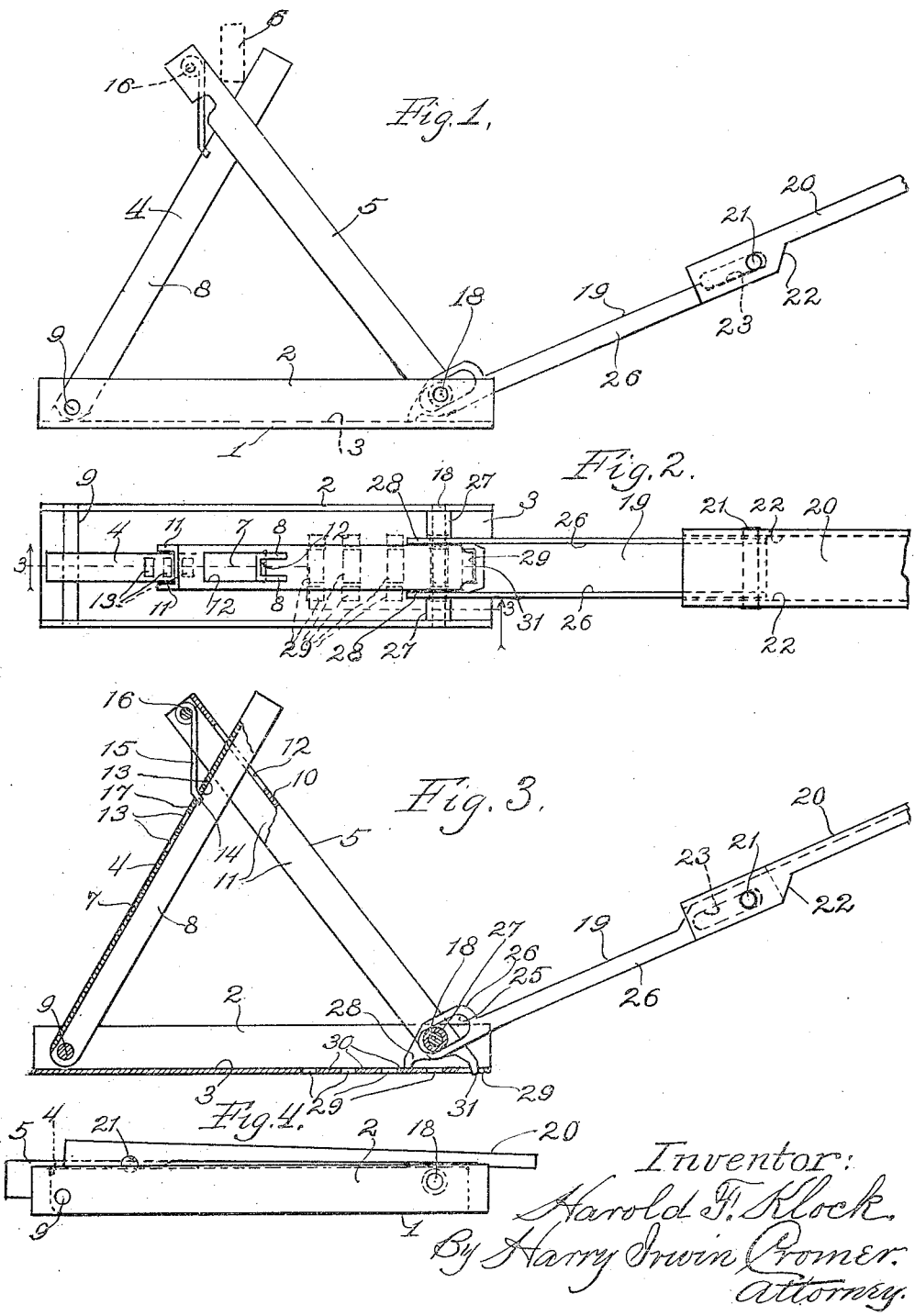

1,428,964

UNITED STATES PATENT OFFICE.

HAROLD F. KLOCK, OF ELGIN, ILLINOIS.

SUPPORT FOR VEHICLES.

Application filed July 2, 1921. Serial No. 482,200.

*To all whom it may concern:*

Be it known that I, HAROLD F. KLOCK, a citizen of the United States, residing in Elgin, in the county of Kane and State of Illinois, have invented certain new and useful Improvements in Supports for Vehicles, of which the following is a specification.

This invention relates to that class of supports for vehicles which are adapted to be placed under a vehicle axle, or other device to be raised or supported thereby, and which may be collapsed or folded in such a manner as to occupy a small space when not in use, and be readily unfolded and placed in operative position when desired.

The principal object of the invention is to provide a simple, economical and efficient support for vehicles or the like.

A further object of the invention is to provide a vehicle support adapted to be used for supporting a vehicle axle or other device, and so constructed as to enable the vehicle support to be readily placed in supporting position under an axle as conveniently as possible and in such a manner as to prevent injury to the clothes of the operator by coming into contact with the vehicle, and to enable the device to be conveniently folded and unfolded so as to occupy a comparatively small space when not in use.

Other and further objects of the invention will appear from the following description and claims, and from an inspection of the accompanying drawings, which are made a part of this specification.

The invention consists in the features, combinations, details of construction, and arrangement of parts, herein described and claimed.

In the accompanying drawings:

Figure 1, is a view in side elevation of a vehicle support constructed in accordance with my invention, showing the same in extended operative position, or in position to support an axle of a vehicle;

Fig. 2, is a plan view of the device shown in Fig. 1;

Fig. 3, is a view in side elevation, but with parts broken away and shown in central vertical section, on line 3—3 of Fig. 2; and Fig. 4, is a view in side elevation of the device shown in Figs. 1, 2 and 3, showing the same as it appears when collapsed or in folded position.

In constructing a support for vehicles, or for supporting vehicle axles or similar devices, in accordance with my invention, I provide a base 1 which is formed, by preference, of sheet metal of sufficient thickness to afford the required strength, and has side flanges 2 extending longitudinally of the base on opposite sides of the bottom or main body portion or web 3 which is, by preference, formed in one integral piece with the side flanges. The base is thus in the form of a channel iron adapted to be laid on the ground with the longitudinal side flanges extending upward on opposite sides of the main body or web portion 3, and forms a light but strong base.

A pair of adjustable crossed bars 4 and 5 are mounted upon and, by preference, in hinged engagement or pivotally connected with the base, so as to project upward therefrom in position to engage and support an axle 6 or other device, to be supported thereby.

The bar 4 is, by preference in the form of a channel iron in cross-section, comprising a central web or main body portion 7, and integral side flanges 8, extending from end to end of the bar; and the bar 4 is pivotally connected at its lower end or base with the base plate 1, by means of a transverse horizontal pivot or hinge member 9, the opposite ends of which are mounted in any desired suitable manner, in the longitudinal side flanges 2, 2 of the base member.

The bar 5, is also formed, by preference of sheet metal bent into the shape of a channel iron, and comprises a central web portion 10, and longitudinal side flanges 11, 11, integral with and extending along opposite sides of said web at right angles to the body of the web, and in position to admit the bar 4 between said longitudinal side flanges. The web 10 is provided with an opening 12 in the upper portion thereof, near the upper extremity of the bar, adapted to admit the bar 4, and permit the upper end of the bar 5 to be raised or lowered with respect to the upper end of the bar 4. And the web 7 of the bar 4 is provided with a series of notches 13, each adapted to admit the lower bent or angular end 14 of a latch or pawl 15, the upper end of which is hinged or pivoted to the bar 5 by means of a transverse pivot pin 16, the opposite ends of which are mounted in the longitudinal side flanges 11, 11, of said bar 5. The web 7 thus forms what may be termed a rack or ratchet having teeth or cross pieces 17 between the notches 13 which receive the pawl when it is in engagement with the corresponding rack tooth or cross piece 17. The pawl is adapted to automatically extend into and in engagement with any desired notch 13, according to the position into which the bar 5 may have been adjusted or raised or lowered with respect to the upper extremity of the bar 4, which adjusted positions may vary according to the height of the axle to be supported, or the height from the ground to which the axle or other device is to be raised and supported.

The bar 5 is adapted to be pivotally connected with or held in hinged engagement with the base 1 by means of a transverse pivot pin 18, the opposite ends of which are mounted in the longitudinal side flanges 2, 2 of the base member 1, near the opposite end of the base from that to which the bottom end of the bar 4 is hinged by the pin 9 already described.

A hinged and, by preference, foldable handle comprising pivotally connected or hinged arms or bars 19 and 20, which are pivotally connected at the outer end of the arm 19 by means of a transverse pivot pin 21 having its opposite ends anchored in longitudinal side flanges 22 on the hinged end of the arm 20 of the handle, and a pair of longitudinally elongated slots 23 in the adjacent longitudinal side flanges 26 on the outer end of the arm 19, is pivotally and foldably connected with the adjustable inclined crossed bar 5 and base 1, and is adapted to serve as a convenient means for enabling the jack to be extended or adjusted in operative position under the axle and body of a vehicle, and between the wheels without the necessity of stooping and reaching under the vehicle. The most convenient way to raise and support the axle upon the jack, when desired, is to first raise the axle by means of an ordinary jack on the outside of the corresponding vehicle wheel, and in engagement with the hub, then place the jack herein described and shown, in position in engagement with the axle on the inner side of the wheel, by means of the handle, thus enabling the outer jack to be removed so as to leave the axle and vehicle wheel in raised position convenient for permitting the removal of the wheel.

The lower end of the arm or bar member 19 of the handle comprising foldable pivotally connected sections or bars 19 and 20, is pivotally connected with the lower end of the vehicle-axle supporting bar or leg 5 by means of lateral openings 25 which are provided in the angular longitudinally extending side flanges 26, 26 of the arm or bar 19, and through which openings 25, the transverse pin 18, extends on opposite sides of the leg or bar 5 already described.

The pin 18 extends through suitable openings in the side flanges 11, 11 of the bar 5, and is, by preference, removable, and provided with any suitable ordinary and well known securing means for holding it in operative position so as to pivotally connect the bottom extremity of the bar 5, the base 1, and the arm 19 of the handle, and permit said parts to be readily taken apart or assembled, as desired.

It is plain that the device is operative when constructed as above described. I prefer, however to provide a sleeve 27 which is mounted upon and projects laterally beyond the opposite side flanges 11, 11 of the bar 5 and encircles the pivot pin 18. This sleeve may extend through openings in the flanges 11, 11, or may be secured in position to form laterally projecting bosses fixed to said flanges or to the arm 5 in any suitable ordinary and well known manner, and adapted to extend into the elongated slots or openings 25, 25 in the flanges 26, 26, of the handle member 19. The handle is thus operatively connected with the bar 5, even though the pin 18 may have been removed. And, it will be readily understood, that when the pin 18 is removed and the projecting sleeve 27 is to be used as a means for pivotally connecting the handle member 19 with the arm 5, the lower end of said arm 5 can be readily adjusted to different positions successively or intermittently, or in a step by step manner, to raise or lower the crotch or crossed upper extremities of the legs or bars 4 and 5, by providing suitable means for operatively connecting the lower end of the bar 5 with the base independently of the pin 18, when desired, and by providing suitable means for operatively connecting the arm member 19 of the handle with the bar 5 and with the base 1. I therefore, provide the arm or handle member 19 with rack-engaging fingers or pawls 28, which may be fixed to the handle member 19, or formed integrally therewith, and are adapted to extend into notches 29, in the base plate or web 3 which has rack teeth or cross pieces 30 between said notches, and may be said to form a rack. And the bar 5 is provided with a downwardly projecting end portion or tooth or pawl member 31 which is adapted to extend into any desired adjacent notch 29 in the rack or web portion 3 of the base 1, and may be raised out of engagement with such notch by raising the handle member 19, when its rack-engaging finger or fingers 28 are in engagement with the notched web or rack 3.

The handle member 19 is thus adapted to form an operating lever, one end of which is adapted to engage the notches 29 successively in such a manner as to enable the lower toothed end of the bar 5 to be raised and moved longitudinally of the rack or web portion 3 of the base member 1, and longitudinally of said base member 1 in a step by step manner, so as to cause the crotch or crossed upper extremities of the bars 4 and 5 to be raised to different adjusted positions and in a step by step manner, when desired, even when the latter are in supporting engagement with a vehicle axle or other device to be raised.

I claim:

1. In a mechanism of the class described, the combination of a base, a pair of oppositely inclined crossed bars flexibly connected with said base and adapted to be adjusted to different inclined positions with respect to each other, and means for connecting said crossed bars in fixed relation to each other in any position into which they are adapted to be adjusted.

2. In a mechanism of the class described, the combination of a base, a pair of oppositely inclined crossed bars flexibly connected with said base, and operatively connected in slidable engagement with each other and adapted to be adjusted to different inclined positions with respect to each other, one of said cross bars having a rack portion provided with a series of openings adapted to engage a pawl, and a pawl mounted on the other of said crossed bars and movable into and out of operative engagement with said rack.

3. In a mechanism of the class described, the combination of a base, a pair of oppositely inclined crossed bars pivotally connected with said base and adapted to be operatively connected in extended slidable engagement with each other in different adjusted positions, a pawl mounted on one of said crossed bars, and pawl-engaging means on the other one of said crossed bars and adapted to engage said pawl in different adjusted positions.

4. In a mechanism of the class described, the combination of a base, a pair of oppositely inclined crossed bars pivotally connected with said base and adapted to be operatively connected in extended adjustable relation to each other in different inclined positions, and means for detachably connecting said crossed bars in fixed relation to each other in different adjusted inclined positions, and adapted to permit said bars to be moved with respect to each other and with respect to the base, to collapsed folded position.

5. In a mechanism of the class described, the combination of a base bar, a pair of oppositely inclined crossed bars in hinged engagement with said base and adapted to be adjusted to different inclined operative positions with respect to each other, means for detachably connecting said crossed bars in fixed relation to each other in different adjusted inclined positions, and adapted to release and permit the said crossed bars to be moved with respect to each other and with respect to the base to collapsed folded position, and a handle foldably connected with said base and crossed bar mechanism.

6. In a mechanism of the class described, the combination of a base member provided with longitudinal side flanges, a pair of oppositely inclined cross bars each provided with longitudinal flanges, one of said crossed bars having an opening therein through which the other of said crossed bars extends, means for flexibly connecting the lower end of each of said crossed bars with said base, a pawl mounted on one of said crossed bars and pawl-engaging means on the other one of said crossed bars and adapted to co-act with said pawl, for detachably connecting said crossed bars in any desired one of a plurality of different adjusted inclined positions with respect to each other.

7. In a mechanism of the class described, the combination of a base member provided with longitudinal side marginal flanges, a pair of oppositely inclined longitudinally flanged cross bars pivotally connected at their lower ends with the flanged base bar, one of said crossed bars having an opening through which the other of said crossed bars extends, a pawl mounted on one of said crossed bars, pawl-engaging means on the other one of said crossed bars and adapted to engage said pawl, for detachably connecting said cross bars in any desired one of a plurality of different adjusted inclined positions with respect to each other, said crossed bars being movable with respect to each other and with respect to the base to folded collapsed position, and a handle foldably connected with said base and crossed bar mechanism.

Signed at Elgin, in the county of Kane, and State of Illinois, this 16th day of June, 1921.

HAROLD F. KLOCK.

Witnesses:
A. EARL COLEMAN,
A. M. HEATH.